US008520998B2

(12) United States Patent
Reed

(10) Patent No.: US 8,520,998 B2
(45) Date of Patent: Aug. 27, 2013

(54) RACEWAY WITH MEDIA RETAINING OFFSET SLOTS

(75) Inventor: Jeffrey W. Reed, Williamsburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 760 days.

(21) Appl. No.: 12/628,766

(22) Filed: Dec. 1, 2009

(65) Prior Publication Data

US 2010/0278502 A1  Nov. 4, 2010

Related U.S. Application Data

(60) Provisional application No. 61/174,226, filed on Apr. 30, 2009.

(51) Int. Cl.
*G02B 6/00* (2006.01)
*H02G 3/08* (2006.01)

(52) U.S. Cl.
USPC .......................................... 385/137; 174/481

(58) Field of Classification Search
USPC .......................................... 385/137; 174/481
See application file for complete search history.

(56) References Cited

U.S. PATENT DOCUMENTS 6,044,194 A * 3/2000 Meyerhoefer ................ 385/134

* cited by examiner

*Primary Examiner* — Ryan Lepisto
*Assistant Examiner* — Jerry Blevins

(57) ABSTRACT

A raceway including a base, a first side wall extending from the base, and a second side wall extending from the base opposite the first side wall. At least one of the first side wall and second side wall includes at least one media retention opening having a bottom surface spaced away from the base and configured to receive at least one media. An offset slot is adjacent the media retention opening and extends from a free edge of the side wall to a depth below the free edge of the media retention opening, such that the offset slot is in communication with the media retention opening.

24 Claims, 4 Drawing Sheets

RACEWAY WITH MEDIA RETAINING OFFSET SLOTS

CROSS-REFERENCE TO RELATED APPLICATIONS

This application claims the benefit of U.S. Provisional Patent Application Ser. No. 61/174,226, filed Apr. 30, 2009, entitled "RACEWAY WITH MEDIA RETAINING OFFSET SLOTS".

BACKGROUND

Traditional media raceways are used to direct media to a destination in a generally inconspicuous and undisturbed manner. However, media can accidentally or inadvertently be dislodged from the raceway, causing the media to rest in an undesired and potentially dangerous manner. For example, such dislodged media can become an interference to or potentially damaged by foreign objects.

DETAILED DESCRIPTION

Figure 1:
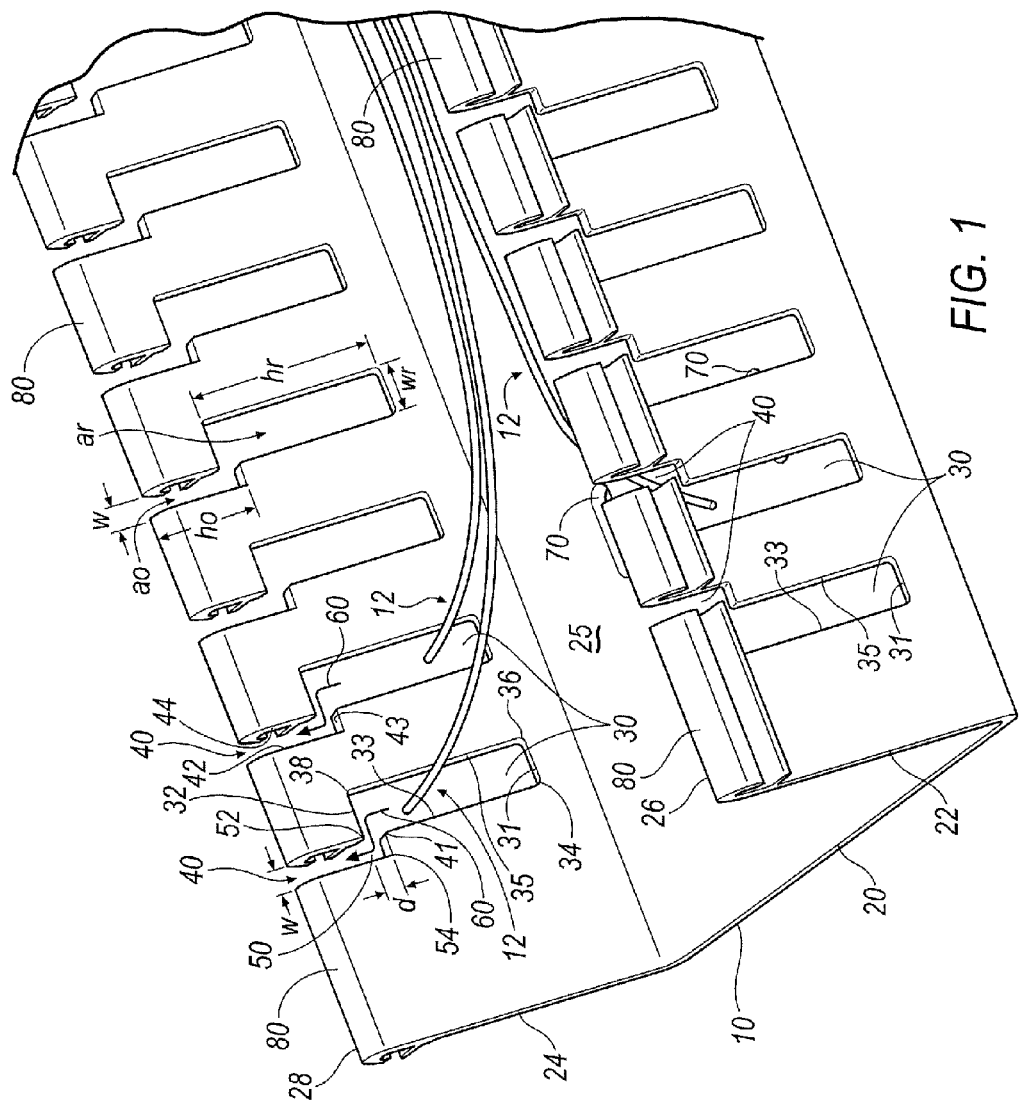
FIG. 1 is a perspective view of a portion of a media raceway.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

Figure 2:
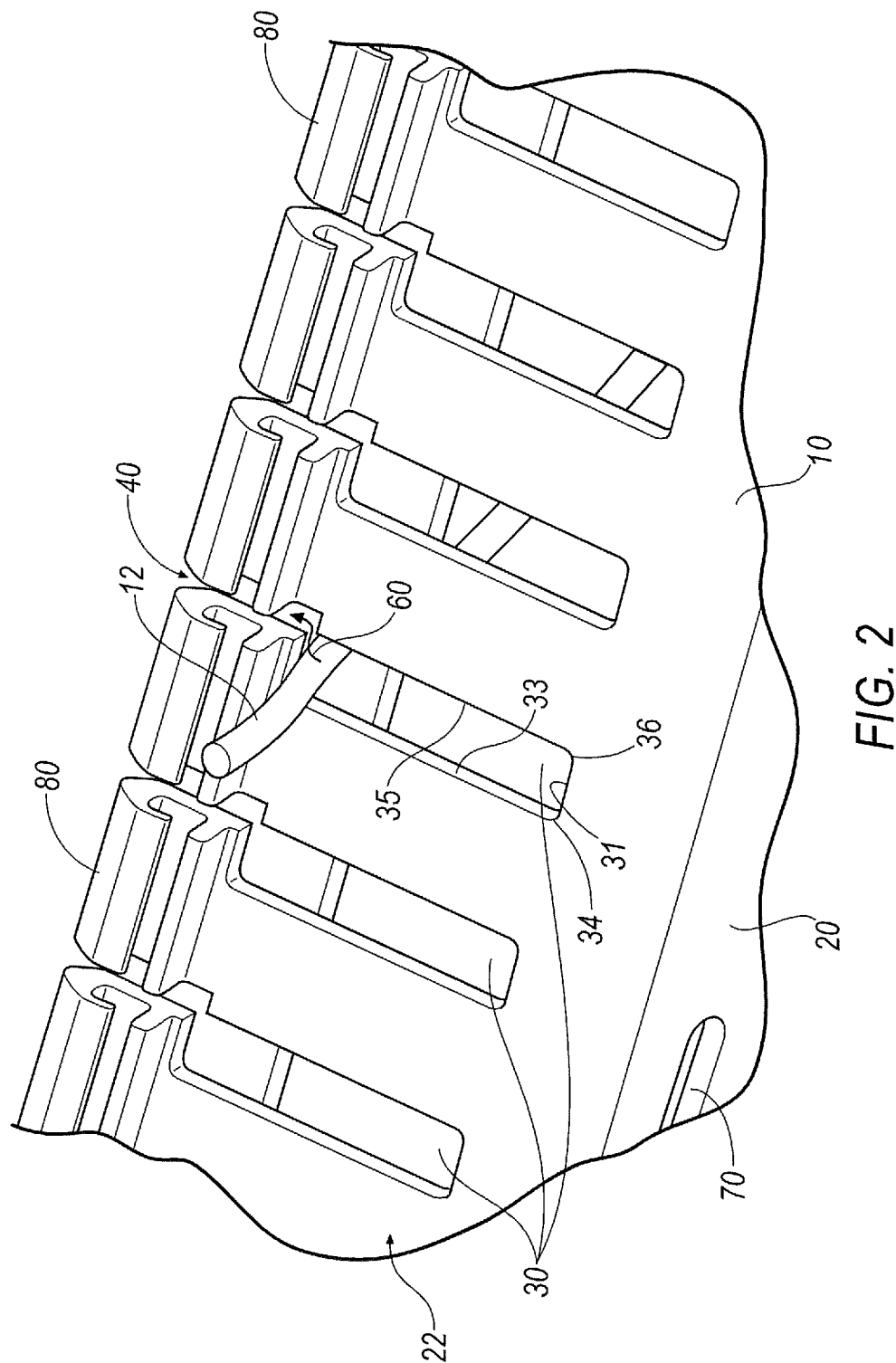
FIG. 2 is a side perspective view of a portion of the media raceway illustrated in FIG. 1.

As seen in FIGS. 1-2, a longitudinally extending media raceway 10 includes a base 20 and a pair of side walls 22, 24 extending away from opposing edges of the base and terminating at free edges 26, 28. Side walls 22, 24 extend from opposing sides of base 20, are generally perpendicular to base 20, and are generally parallel to each other.

Free edges 26, 28 of side walls 22, 24 may include latching mechanisms 80 for receiving a cover to restrain media 12 within media raceway 10. Any suitable latching mechanisms can be used to receive the cover. Base 20 may include mounting holes 70 to enable mounting of media raceway 10 to a support structure.

The volume circumscribed by base 20 and sidewalls 22, 24 define an interior 25 of raceway 10. Raceway 10 is configured to receive a plurality of media 12, such as fiber optic cables or wires. Side walls 22, 24 each include a plurality of media retention openings 30, which are spaced apart from one another. In one illustrative approach media retention openings 30 are shown as being of a generally rectangular configuration, and are defined by a bottom surface 31, side surfaces 33, 35, and top surface 32. Media retention openings 30 are configured to allow at least one media 12 to pass between the interior and the exterior of media raceway 10.

Side walls 22, 24 include a plurality of offset slots 40, which are defined by offset slot surfaces 42, 43 and 44. Offset slots 40 are adjacent and engage an associated media retention opening 30. Offset slots 40 extend from one of free edges 26, 28 of side walls 22, 24 toward base 20. As shown in FIG. 1, each slot 40 extends a depth d below the top surface 32 of media retention opening 30, such that each offset slot 40 engages and is in communication with the adjacent media retention opening 30 by a jog 50. The depth d of offset slot 40 below top surface 32 of media retention opening 30 may be equal to or greater than the width w of offset slot 40. Depth d of offset slot 40 may be larger than the greatest dimension (e.g., diameter) of media 12 such that there is not an interference fit between the media 12 and slot 40. If depth d of offset slot 40 is less than the diameter of media 12, the media may not readily fit in offset slot 40, and it may be more difficult to navigate the media into or out of the associated media retention opening 30. If depth d is too small, there is a risk of causing damage to media 12 when navigating media 12 through jog 50. Providing a depth d of offset slot 40 which is equal to or greater than the width w of offset slot 40 allows media 12 to be directed out of or into the media retention opening 30 in a fluid manner, without risk of damaging media 12, while preventing media 12 from accidentally working its way out of media retention opening 30. On the other hand, if the depth d of the offset slot 40 is too great, media 12 may inadvertently and undesirably work its way out of media retention opening 30. In one exemplary arrangement, depth d is equal to width w.

Jog 50 is generally parallel to base 20, and makes it more difficult for media 12 to accidentally work its way out of media retention opening 30. The inclusion of jog 50 requires media 12 to navigate in a first direction, generally parallel to base 20, and then change direction and navigate in a direction generally perpendicular to base 20, to be free from media retention opening 30. As media 12 must navigate in multiple directions to be free from media retention opening 30, it is less likely to occur by accident.

Figure 3:
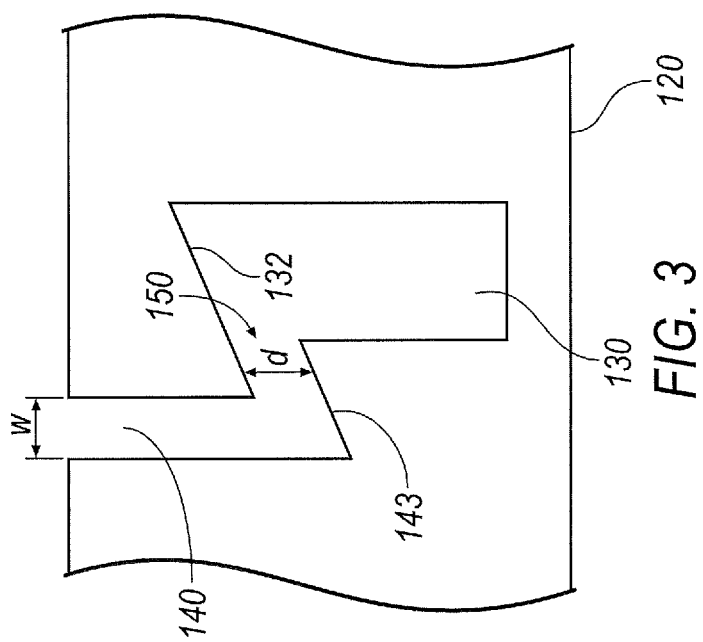
FIG. 3 is an alternative illustration of a media retention opening and offset slot of the raceway of FIG. 1.

Although jog 50 is shown as generally parallel to base 20, jog 50 can also be angled with respect to base 20 as shown in FIG. 3. Providing jog 150 at an angle to base 120 can either help retain media 12 within media retention opening 130, or promote removal of media 12 from media retention opening 130, depending on the angle at which jog 150 is to base 120. While a generally common angle is shown in FIG. 3 between a lower surface 143 of slot 140 and upper surface 132 of media retention opening 130 to maintain a generally consistent dimension d, in some exemplary approaches only one of the surfaces 143, 132 may be angled.

Figure 4:
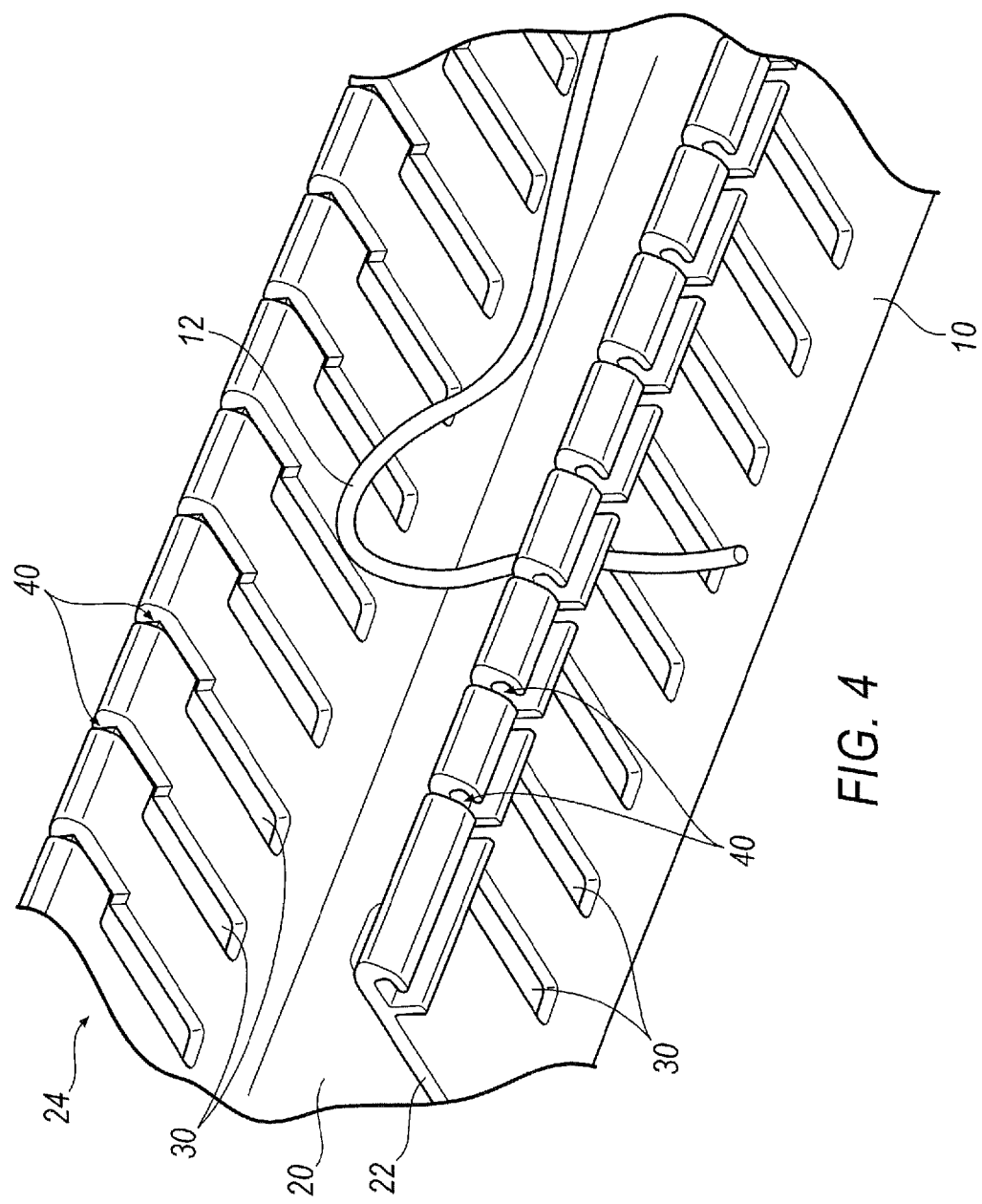
FIG. 4 is a perspective view of an alternative illustration of FIG. 1

Returning to FIG. 1, in the illustrative approach side walls 22, 24 include opposing pairs of offset slots 40. Media retention openings 30 in side walls 22, 24 are not aligned with each other as media retention openings 30 in side wall 22 are to one side of offset slots 40, while media retention openings 30 in side wall 24 are to the other side of offset slots 40. This arrangement is for illustrative purposes only. FIG. 4 is an alternative illustration of raceway 10, in which media retention openings 30 in side walls 22, 24 are aligned with each other. The arrangement of offset slots 40 with respect to an associated media retention opening 30 for side walls 22, 24 will depend in part on the environment in which the raceway 10 is to be used. For example, if there is a chance that the media 12 may be subjected to a tensile force unassociated with removal or insertion into raceway 10 it may be desirable to have the offset slot 40 positioned in such a manner that the tensile force actually helps to retain the media within media retention opening 30 rather than promoting potential removal by way of jog 50.

Corners 34, 36, 38 of media retention opening 30, corners 52 and 54 of jog 50 and corner 41 of offset slot 40 may be rounded to minimize potential damage to media 12 when the media is drawn into contact with one of the corners. Additionally, bottom surface 31, side surfaces 33, 35, and top surface 32 of media retention opening 30, and offset slot surfaces 42, 43 and 44 of offset slot 40 may be smooth in the sense of at least lacking protrusions of the type that could potentially damage media 12 when media 12 is drawn into contact with one of the surfaces.

As shown in FIG. 1, media retention opening 30 has a width wr, which is greater than the width w of offset slot 40, has a height hr, which is greater than the height ho of offset slot 40, and encompasses an area ar, which is greater than the area ao encompassed by offset slot 40. However, other arrangements of the media retention opening 30 and offset slot 40 also serve to help retain media 12 in media retention opening 30.

Although side walls 22, 24 are both shown to include media retention openings 30 and offset slots 40 in FIGS. 1, 2 and 4, only one of side walls 22, 24 may include media retention openings 30 and offset slots 40. Additionally, although side walls 22, 24 are both shown to include a plurality of media retention openings 30, side walls 22, 24 may include any number of media retention openings 30.

In operation, base 20 may be mounted to a support structure such as by way of openings 70 and a plurality of media 12 placed in the interior 25 of media raceway 10. At desired locations along media raceway 10, one or more media 12 may pass through a media retention opening 30 for connection to a device. If media 12 is already connected to a device, media 12 may be inserted into the desired offset slot 40 at the opening at the free edge 26, 28 of side wall 22, 24, and navigated through offset slot 40 and jog 50 to be secured into media retention opening 30. Rounded corners 34, 36, 38, 41, 52 and 54 and smooth surfaces 42, 43 and 44 of offset slot 40 and 31, 32, 33 and 35 of media retention opening 30 prevent damage from occurring to media 12 during and after insertion of media 12 into media retention opening 30. Media 12 are prevented from accidentally being removed from media retention opening 30 as media 12 are required to travel in two directions (generally horizontally and generally vertically with respect to base 20) to navigate jog 50 and offset slot 40 as shown by arrow 60 in FIG. 2. This is unlikely to occur without specific assistance navigating media 12 out of media retention opening 30.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A raceway comprising:
   a base;
   a first side wall extending from the base and terminating at a first free edge; and
   a second side wall extending from the base opposite the first side wall and terminating at a second free edge, the base, the first side wall and the second sidewall defining an interior volume within the raceway;
   at least one of the first side wall and second side wall including at least one media retention opening having a bottom surface spaced away from the base and an opposing top surface, the opening configured to receive at least one media; and
   an offset slot adjacent to the media retention opening, the offset slot extending from the free edge of the at least one side wall to a depth below the top surface of the media retention opening such that the offset slot is in communication with the media retention opening; wherein the first side wall and the second side wall each include a plurality of media retention openings and offset slots adjacent the plurality of media retention openings; and wherein the media retention openings on the first side wall and the second side wall are not aligned with one another.

2. The media raceway of claim 1 wherein the first side wall and the second side wall include opposing pairs of media retention openings.

3. The media raceway of claim 1 wherein the offset slot is in communication with the media retention opening via a jog.

4. A media retention mechanism comprising:
   a wall having a free edge and a bottom edge, the wall including at least one media retention opening, the opening having a bottom surface having a first length and spaced away from the bottom edge and an opposing top surface having a second length, the media retention opening configured to receive at least one media, and an offset slot adjacent the media retention opening and extending from the free edge of the wall to a depth below the top surface of the media retention opening, such that the offset slot is in communication with the media retention opening, wherein the second length of the top surface is at least as long as the first length of the bottom surface.

5. The media retention mechanism of claim 4 wherein the offset slot is in communication with the media retention opening via a jog.

6. A method for retaining media comprising:
   providing a raceway including a base, a first side wall extending from the base, and a second side wall extending from the base opposite the first side wall, wherein at least one of the first side wall and second side wall includes at least one media retention opening having a bottom surface spaced away from the base and an opposing top surface, the media retention opening configured for selectively receiving at least one media, and an offset slot adjacent the media retention opening and extending from a free edge of the side wall to a depth below the top surface of the media retention opening, such that the offset slot is in communication with the media retention opening via a jog;

inserting the media into the offset slot at the free edge of the side wall;

navigating the media through the offset slot; and securing the media into the media retention opening.

7. A raceway comprising:

a base;

a first side wall extending from the base and terminating at a first free edge; and a second side wall extending from the base opposite the first side wall and terminating at a second free edge, the base, the first side wall and the second sidewall defining an interior volume within the raceway;

at least one of the first side wall and second side wall including at least one media retention opening having a bottom surface spaced away from the base and an opposing top surface, the opening configured to receive at least one media; and an offset slot adjacent to the media retention opening, the offset slot extending from the free edge of the at least one side wall to a depth below the top surface of the media retention opening such that the offset slot is in communication with the media retention opening;

wherein the offset slot is in communication with the media retention opening via a jog.

8. The media raceway of claim 7 wherein the jog is generally parallel to the base.

9. The media raceway of claim 7 wherein the jog is angled with respect to the base.

10. The media raceway of claim 7 wherein the depth of the offset slot below the top surface of the media retention opening is equal to or greater than the width of the offset slot.

11. The media raceway of claim 7 wherein the depth of the offset slot below the top surface of the media retention opening is greater than the corresponding greatest dimension of the media.

12. The media raceway of claim 7 wherein the width of the media retention opening is greater than the width of the offset slot.

13. The media raceway of claim 7 wherein the height of the media retention opening is greater than the height of the offset slot.

14. The media raceway of claim 7 wherein the area encompassed by the media retention opening is greater than the area encompassed by the offset slot.

15. The media raceway of claim 7 wherein the free edge of the first side wall and free edge of the second side wall include latching mechanisms for receiving a cover.

16. A media retention mechanism comprising:

a wall having a free edge and a bottom edge, the wall including at least one media retention opening having a bottom surface spaced away from the bottom edge and an opposing top surface, the media retention opening configured to receive at least one media, and an offset slot adjacent the media retention opening and extending from the free edge of the wall to a depth below the top surface of the media retention opening, such that the offset slot is in communication with the media retention opening via a jog.

17. The media retention mechanism of claim 16 wherein the wall includes a plurality of media retention openings and offset slots adjacent the plurality of media retention openings.

18. The media retention mechanism of claim 16 wherein the jog is generally parallel to the bottom edge.

19. The media retention mechanism of claim 16 wherein the jog is angled with respect to the bottom edge.

20. The media retention mechanism of claim 16 wherein the depth of the offset slot below the top surface of the media retention opening is equal to or greater than the width of the offset slot.

21. The media retention mechanism of claim 16 wherein the depth of the offset slot below the top surface of the media retention opening is greater than the diameter of the media.

22. The media retention mechanism of claim 16 wherein the width of the media retention opening is greater than the width of the offset slot.

23. The media retention mechanism of claim 16 wherein the height of the media retention opening is greater than the height of the offset slot.

24. The media retention mechanism of claim 16 wherein the area encompassed by the media retention opening is greater than the area encompassed by the offset slot.

* * * * *